US012074519B2

(12) United States Patent
Bogue et al.

(10) Patent No.: US 12,074,519 B2
(45) Date of Patent: Aug. 27, 2024

(54) SYSTEM FOR PROFILING POWER USING TON PULSES

(71) Applicant: Ambiq Micro, Inc., Austin, TX (US)

(72) Inventors: Ivan Bogue, Austin, TX (US); Jesse Coulon, Austin, TX (US); Andre Belanger, Austin, TX (US)

(73) Assignee: Ambiq Micro, Inc., Austin, TX (US)

( * ) Notice: Subject to any disclaimer, the term of this patent is extended or adjusted under 35 U.S.C. 154(b) by 0 days.

(21) Appl. No.: 18/336,746

(22) Filed: Jun. 16, 2023

(65) Prior Publication Data

US 2024/0039404 A1 Feb. 1, 2024

Related U.S. Application Data

(63) Continuation of application No. 17/877,318, filed on Jul. 29, 2022, now Pat. No. 11,682,967.

(51) Int. Cl.
*H02M 3/157* (2006.01)
*G06F 1/26* (2006.01)
*H02M 3/158* (2006.01)

(52) U.S. Cl.
CPC .............. *H02M 3/157* (2013.01); *G06F 1/26* (2013.01); *H02M 3/158* (2013.01)

(58) Field of Classification Search
CPC .......... H02M 3/157; H02M 3/158; G06F 1/26
See application file for complete search history.

(56) References Cited

U.S. PATENT DOCUMENTS 11,682,967 B1 * 6/2023 Bogue ................ H02M 1/0012
323/271
2016/0109494 A1 4/2016 Hanson
2020/0321866 A1 10/2020 Bogue

* cited by examiner

*Primary Examiner* — Rafael O Leon De Domenech
(74) *Attorney, Agent, or Firm* — NIXON PEABODY LLP

(57) ABSTRACT

A system for determining a power requirement for a device powered by a buck converter on a system on chip based on Time on pulses (Ton) is disclosed. A buck converter supplies output voltage to enable the device. The buck converter is driven by a Ton pulse generator generating Ton pulses to control charging of a load capacitor. A counter counts the Ton pulses during the supply of output voltage while the device is enabled. A controller is coupled to the counter and the buck converter. The controller determines the power requirement for the device based on the count of the Ton pulses. The power requirement may be used to adjust the trim value to change the width of the Ton pulses for greater energy efficiency.

20 Claims, 6 Drawing Sheets

SYSTEM FOR PROFILING POWER USING TON PULSES

The present disclosure is a continuation of U.S. application Ser. No. 17/877,554,318 filed on Jul. 29, 2022. The contents of that application are hereby incorporated by reference in its entirety.

TECHNICAL FIELD

The present disclosure relates generally to system on chip microcontrollers. More particularly, aspects of this disclosure relate to a system that uses a count of Ton pulses in a buck converter to provide a power profile for devices powered by the buck converter.

BACKGROUND

In recent years, due to the growth of portable electronics, there has been a push to decrease the power used by microcontrollers (or "MCU"), microprocessors, application processors, digital signal processors (DSPs), neural processing units (NPUs), and other circuits used in portable electronic appliances. With lower power requirements, effective electronics operation time can be extended, or alternatively, smaller batteries can be used. Commonly, the power consumption of a microcontroller and associated circuits may be reduced by using a lower supply voltage, or by reducing the amount of internal capacitance being charged and discharged during the operation of the circuit.

One method for reducing microcontroller power relies on hardware or software-based power mode switching. Power modes can be selected for microcontroller components or resources based on operating state, operating conditions, and/or sleep cycle characteristics and other factors to configure low power modes for selected microcontroller components at the time the processor enters a low power or sleep state. In some systems, a set of predefined low power configurations can be used, while more sophisticated systems can dynamically select low power configurations to maximize power savings while still meeting system latency requirements.

However, even with available low power modes, microcontroller power usage can be adversely affected by interactions with connected sensors, memory systems, or other peripherals. Frequent interrupts or requests for service from such peripherals can greatly limit the time a microcontroller can remain in a low power mode. Systems that provide a reliable overall power management protocol and components for very low power operation are still needed.

BRIEF DESCRIPTION OF THE DRAWINGS

The disclosure will be better understood from the following description of exemplary embodiments together with reference to the accompanying drawings, in which.

Figure 1A:
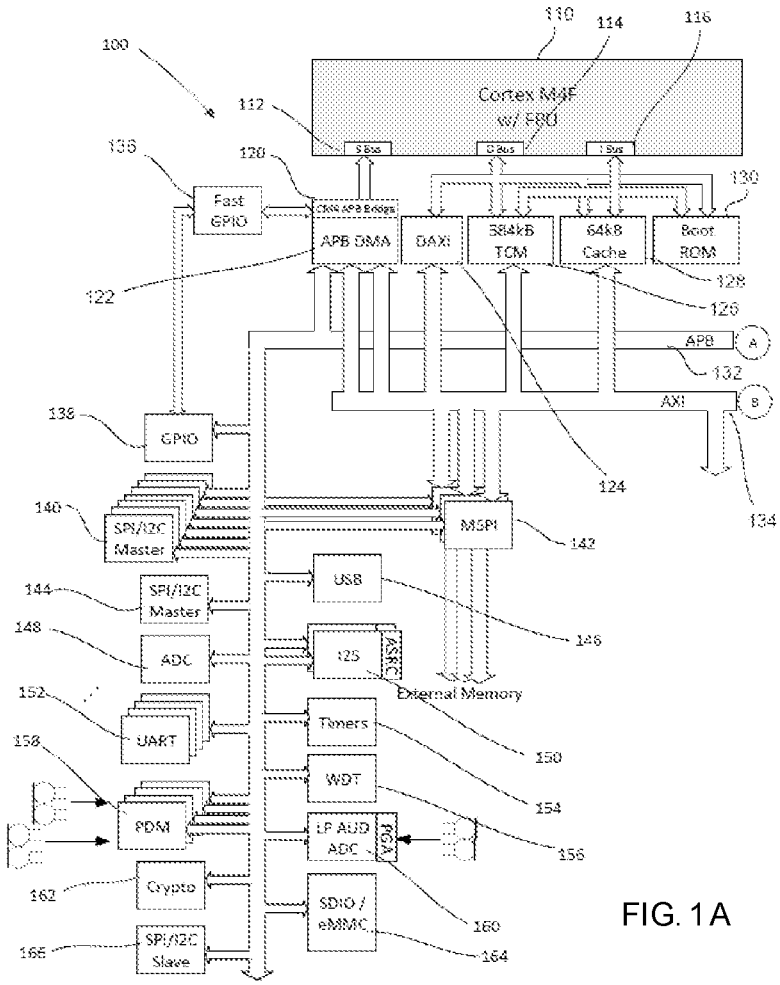
FIG. 1A-1B is a block diagram of the example low power microcontroller system.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter; nor is it intended to be used in isolation to determine the scope of the claimed subject matter. The subject matter should be understood by reference to appropriate portions of the entire specification of this disclosure, any or all drawings and each claim.

One disclosed example is a system for determining a power requirement for a device powered by a buck converter. The system includes a buck converter supplying output voltage to enable the device. The output voltage of the buck converter is driven by a Time on (Ton) pulse generator generating Ton pulses to control charging of a load capacitor. A counter storing a count of Ton pulses during the supply of output voltage. A controller is coupled to the counter and the buck converter. The controller determines the power requirement for the device based on the count of the Ton pulses.

In another disclosed implementation of the example system, the device and buck converter are integrated in a system on chip. In another disclosed implementation, the controller is further operable to determine an adjustment for the buck converter based on the power requirement. In another disclosed implementation, the buck converter includes a register, and the controller is operable to store the determined trim value in the register. The buck converter adjusts the duration of the Ton pulses generated by the Ton pulse generator for supplying output voltage to enable the device based on the determined trim value. In another disclosed implementation, the controller is operable to store the determined power requirement. In another disclosed implementation, the controller is operable to determine a first device function performed by the device; associate the determined power requirement with the first device function; determine a second device function performed by the device; and determine a second power requirement determined from the count of Ton pulses from the device performing the second device function; and associate the determined second power requirement with the second device function. In another disclosed implementation, the device includes the counter.

In another disclosed implementation, the device is one of an ADC, a DAC, an UART, a controller, or a storage component. In another disclosed implementation, the controller includes a bank of registers. The power requirement determined from the count of Ton pulses associated with the device is stored in one of the registers of the bank of registers, and the other registers store a corresponding power requirement determined from a count of Ton pulses from different devices powered by the buck converter. In another disclosed implementation, the buck converter has different voltage level outputs based on connection of a high frequency clock and a low frequency clock. In another disclosed implementation, the controller is operative to determine a flaw in an external power source coupled to the buck converter, based on a comparison of the count of Ton pulses being more than a previous count of Ton pulses associated with the device. In another disclosed implementation, the count of the Ton pulses is determined by detecting a leading edge of the pulse. In another disclosed implementation, the count of the Ton pulses is determined by detecting a voltage ripple from the output voltage of the buck converter.

Another disclosed example is a method of determining power requirement of a device on a system on chip. A voltage output of a buck converter is coupled to enable the device. Time on (Ton) pulses are generated to drive the buck converter to provide a voltage level at the voltage output for operation of the device. A count of the Ton pulses is determined in a counter. A count of the Ton pulses from the counter is determined after depowering the device. The power requirement of the device is determined based on the stored count of the Ton pulses.

In another disclosed implementation, the disclosed method includes adjusting the buck converter based on the determined power requirement. In another disclosed implementation, the disclosed method includes determining a trim value for the duration of the Ton pulse based on the power requirement. In another disclosed implementation, the disclosed method includes transmitting the power requirement of the device to an external device. In another disclosed implementation, the disclosed method includes determining a flaw in an external power source coupled to the buck converter based on a comparison of the count of Ton pulses being more than a previous count of Ton pulses associated with the device.

Another disclosed example is a non-transitory computer readable medium having stored thereon software instructions that, when executed by a processor, cause the processor to store a count of Ton pulses driving a buck converter powering a device. The power requirement of the device is determined based on the stored count of Ton pulses. The instructions also cause the processor to adjust the power to the device provided from the buck converter based on the determined power requirement.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure is directed toward determining the frequency of time on (Ton) pulses in a buck converter to determine power requirements for different components or devices that are powered by the buck converter. The count of Ton pulses is stored and are correlated with the power for a specific component or device. A power profile of particular devices determined from the frequency of Ton pulses derived from the count. The power profile may be used to program the buck converter to provide power to the particular device more efficiently.

Figure 1B:
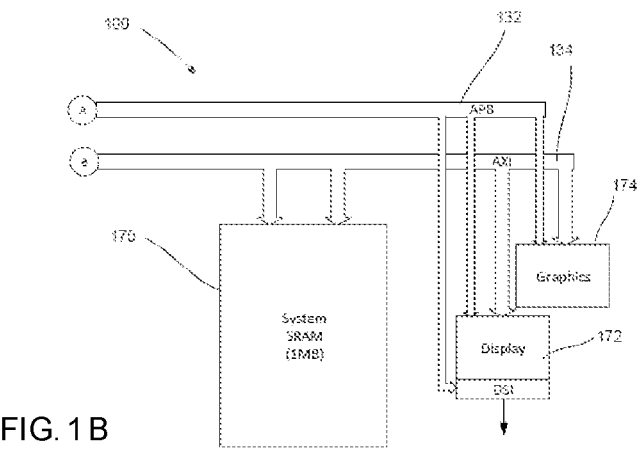

FIGS. 1A-1B are a block diagram of an example low power microcontroller system 100. The example low power microcontroller system 100 includes a central processing unit (CPU) 110. The CPU 110 in this example is Cortex M4F (CM4) with a floating point unit. The CPU 110 includes a System-bus interface 112, a Data-bus interface 114, and an Instruction-bus interface 116. It is to be understood, that other types of general CPUs, or other processors such as DSPs or NPUs may incorporate the principles described herein.

The System-bus interface 112 is coupled to a Cortex M4 advanced peripheral bus (APB) bridge 120 that is coupled to an advanced peripheral bus (APB) direct memory access (DMA) module 122. The microcontroller system 100 includes a Data Advanced eXtensible Interface (DAXI) 124, a tightly coupled memory (TCM) 126, a cache 128, and a boot ROM 130. The Data-bus interface 114 allows access to the DAXI 124, the TCM 126, the cache 128, and the boot read only memory (ROM) 130. The Instruction-bus interface 116 allows access to the TCM 126, the cache 128, and the boot ROM 130. In this example, the DAXI interface 124 provides write buffering and caching functionality for the microcontroller system 100. The DAXI interface 124 improves performance when accessing peripherals like the SRAM and the MSPIs.

An Advanced Peripheral Bus (APB) 132 and an Advanced eXtensible Interface (AXI) bus 134 are provided for communication between components on the microcontroller system 100. The APB 132 is a low speed and low overhead interface that is used for communicating with peripherals and registers that don't require high performance and don't change often (e.g., when a controller wants to set configuration bits for a serial interface). The AXI bus 134 is an ARM standard bus protocol that allows high speed communications between multiple masters and multiple busses. This is useful for peripherals that exchange large amounts of data (e.g., a controller that talks to an ADC and needs to transfer ADC readings to a microcontroller or a GPU that talks to a memory and needs to transfer a large amount of graphics data to/from memories).

A fast general purpose input/output (GPIO) module 136 is coupled to the APB bridge 120. A GPIO module 138 is coupled to the fast GPIO module 136. The APB 132 is coupled to the GPIO module 138. The APB 132 is coupled to a series of Serial Peripheral Interface/Inter-Integrated Circuit (SPI/I2C) interfaces 140 and a series of Multi-bit Serial Peripheral Interfaces (MSPI)s 142. The MSPIs 142 are also coupled to the AXI bus 134 and provide access to external memory devices.

The APB 132 also is coupled to a SPI/I2C interface 144, a universal serial bus (USB) interface 146, an analog to digital converter (ADC) 148, an Integrated Inter-IC Sound Bus (I2S) interface 150, a set of Universal Asynchronous Receiver/Transmitters (UART)s 152, a timers module 154, a watch dog timer circuit 156, a series of pulse density modulation (PDM) interfaces 158, a low power audio ADC 160, a cryptography module 162, a Secure Digital Input Output/Embedded Multi-Media Card (SDIO/eMMC) interface 164, and a SPI/I2C slave interface module 166. The PDM interfaces 158 may be connected to external digital microphones. The low power audio ADC 160 may be connected to an external analog microphone through internal programmable gain amplifiers (PGA).

A system non-volatile memory (NVM), which is 2MB in size in this example, is accessible through the AXI bus 134. A system static random access memory (SRAM) 170, which is 1MB in this example is accessible through the AXI bus 134. The microcontroller system 100 includes a display interface 172 and a graphics interface 174 that are coupled to the APB bus 132 and the AXI bus 134.

Components of the disclosed microcontroller system 100 are further described by U.S. Provisional Ser. No. 62/557,534, titled "Very Low Power Microcontroller System," filed Sep. 12, 2017; U.S. application Ser. No. 15/933,153, filed Mar. 22, 2018 titled "Very Low Power Microcontroller System," (Now U.S. Pat. No. 10,754,414), U.S. Provisional Ser. No. 62/066,218, titled "Method and Apparatus for Use in Low Power Integrated Circuit," filed Oct. 20, 2014; U.S. application Ser. No. 14/855,195, titled "Peripheral Clock Management," (Now U.S. Pat. No. 9,703,313), filed Sep. 15, 2015; U.S. application Ser. No. 15/516,883, titled "Adaptive Voltage Converter," (Now U.S. Pat. No. 10,338,632), filed Sep. 15, 2015; U.S. application Ser. No. 14/918,406, titled "Low Power Asynchronous Counters in a Synchronous System," (Now U.S. Pat. No. 9,772,648), filed Oct. 20, 2015; U.S. application Ser. No. 14/918,397, titled "Low Power Autonomous Peripheral Management," (Now U.S. Pat. No. 9,880,583), filed Oct. 20, 2015; U.S. application Ser. No. 14/879,863, titled "Low Power Automatic Calibration Method for High Frequency Oscillators," (Now U.S. Pat. No. 9,939,839), filed Oct. 9, 2015; U.S. application Ser. No. 14/918,437, titled "Method and Apparatus for Monitoring Energy Consumption," (Now U.S. Pat. No. 10,578,656), filed Oct. 20, 2015; U.S. application Ser. No. 17/081,378, titled "Improved Voice Activity Detection Using Zero Crossing Detection," filed Oct. 27, 2020, U.S. application Ser. No. 17/081,640, titled "Low Complexity Voice Activity Detection Algorithm," filed Oct. 27, 2020, all of which are hereby incorporated by reference.

Figure 2:
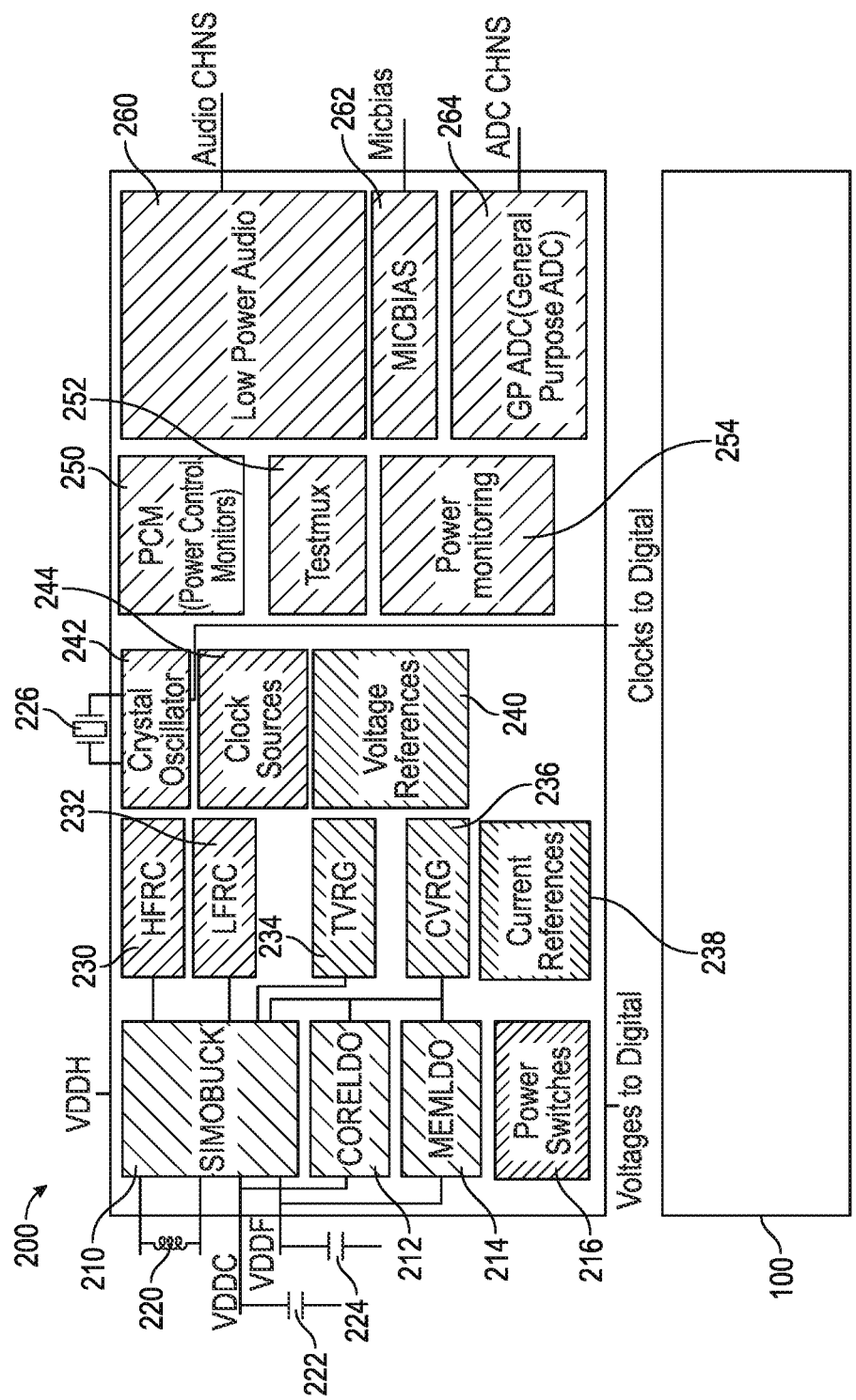
FIG. 2 is a block diagram of an example analog module that supplies power, external signals, and clock signals to the low power microcontroller system in FIG. 1.

FIG. 2 shows a block diagram of an analog module 200 that interfaces external components with the microcontroller system 100 in FIG. 1. The analog module 200 supplies power to different components of the microprocessor system 100 as well as providing clocking signals to the microcontroller system 100. The analog module 200 includes a Single Inductor Multiple Output (SIMO) buck converter 210, a core low drop-out (LDO) voltage regulator 212, and a memory LDO voltage regulator 214. The LDO voltage regulator 212 supplies power to processor cores of the microcontroller system 100, while the memory LDO voltage regulator 214 supplies power to volatile memory devices of the microcontroller system 100 such as the SRAM 170. A switch module 216 represents switches that allow connection of power to the different components of the microcontroller system 100.

The SIMO buck converter module 210 is coupled to an external inductor 220. The module 200 is coupled to a core VDD (VDDC) capacitor 222 and a memory VDD (VDDF) capacitor 224. The VDDC capacitor 222 smooths the voltage output of the core LDO voltage regulator 212 and the SIMO buck converter 210. The VDDF capacitor 224 smooths the voltage output of the memory LDO voltage regulator 214 and the SIMO buck converter 210. The analog module 200 is also coupled to an external crystal 226.

The SIMO buck converter 210 is coupled to a high frequency resistor-capacitor (HFRC) oscillator circuit 230, a low frequency resistor-capacitor (LFRC) circuit 232, and a temperature-sensitive voltage reference generator (TVRG) circuit 234. In this example, the HFRC provides all the primary clocks for the high frequency digital processing blocks in the microcontroller system 100 except for audio, radio and high power mode clocks. In this example, the LFRC oscillator includes a distributed digital calibration function similar to that of the external oscillator. A calibrated voltage reference generator (CVRG) circuit 236 is coupled to the SIMO buck converter 210, the core LDO voltage regulator 212, and the memory LDO voltage regulator 214. Thus, both trim compensation and temperature compensation are performed on the voltage sources. A set of current reference circuits 238 is provided as well as a set of voltage reference circuits 240. The reference circuits 238 and 240 provide stable and accurate voltage and current references, allowing the maintenance of precise internal voltages when the external power supply voltage changes.

In this example, the LDO voltage regulators 212 and 214 are optionally used to power up the microcontroller system 100. The more efficient SIMO buck converter 210 is preferably used to power the same components.

A crystal oscillator circuit 242 is coupled to the external crystal 226. The crystal oscillator circuit 242, LFRC oscillator 232, and HFRC oscillator 230 together serve as a set of clock sources 244. The clock sources 244 include multiple clocks providing different frequency signals to the components on the microcontroller system 100.

The analog module 200 also includes a process control monitoring (PCM) module 250 and a test multiplexer 252. Both the PCM module 250 and the test multiplexer 252 allow testing and trimming of the microcontroller system 100 prior to shipment. The PCM module 250 includes test structure that allow programming of the compensation voltage regulator 236. The test multiplexer 252 allows trimming of different components on the microcontroller system 100. The analog module 200 includes a power monitoring module 254 that allows power levels to different components on the microcontroller system 100 to be monitored. The power monitoring module 254, in this example, includes multiple state machines that determine when power is required by different components of the microprocessor system 100. The power switch module 216 connects voltages generated by the SIMO buck converter 210 and LDOs 212 and 214 with voltage rails that support components of the microprocessor system 100. The analog module 200 includes a low power audio module 260 for audio channels, a microphone bias module 262 for biasing external microphones, and a general purpose analog to digital converter 264.

Examples of the present disclosure allow a controller to use a count of Time on (Ton) pulses to determine power requirements of components and devices on the analog module 200 and the microcontroller system 100 that are powered by the buck converter 210. As will be explained, the power requirement may be used to adjust the buck converter 210 for the powering the components and devices more efficiently. For example, trim values input to the buck converter 210 that determine the duration of the Ton pulses may be adjusted to provide the most efficient delivery of the power requirement for each specific device or component.

The Single Inductor Multiple Output (SIMO) buck converter 210 (shown in FIGS. 1-2) supplies DC voltage at different levels to components and devices of the microcontroller system 100 in FIG. 1 and the analog module 200 in FIG. 2. The buck converter 210 can output voltage at a single level or may be controlled to output different voltage levels. As explained above, the SIMO buck converter 210 is coupled via the power switch module 216 to provide power and thus enable different components and devices on the microcontroller system 100 and the analog module 200. The SIMO buck converter 210 serves as an efficient power supply for the components and devices on the microcontroller system 100 and the analog module 200.

The switches in the power switch module 216 connect the SIMO buck converter 210 to a specific device or component. Once connected via one of the switches in the power switch module 216, every time there is a voltage drop below a threshold level due to power consumption by the component or device connected to the buck converter 210, a voltage comparator in the buck converter 210 generates constant Time on (Ton) pulses. The Ton pulses supply charge to switch high-side logic of the SIMO buck converter 210 to a load capacitor so that there is a voltage boost to replenish the voltage drop. The frequency of the Ton pulses indicates power consumption of the components in the microcontroller system 100 and the analog module 200 that are powered by the buck converter 210. The more loads that are operating in the microcontroller system 100, the faster the voltage drops in the load capacitor of the SIMO buck converter 210, and the more frequently the voltage in the load capacitor needs to be replenished through Ton pulses.

The time duration of the Ton pulse forms a clock cycle and can be measured by a counter, and averaged out. The amount of charge per Ton pulse delivered by the buck converter 210 is a function of the time duration of the Ton pulses, the input voltage of the battery power supply connected to the buck converter 210, and the output voltage generated by the buck converter 210. Power profiling of different peripherals connected to the microcontroller system 100 or components and device of the microcontroller system 100 and the analog module 200 based on the Ton pulses can provide granular insight into power consumption in the SIMO buck converter 210, which provides insight into ways to achieve power savings. For example, the Ton pulse count may be used to determine power consumption during initial testing for purposes of adjusting trims of devices on the chip for efficient power consumption. The Ton pulse count data may be periodically gathered to provide operating data for the chip that may be stored or transmitted for monitoring of chip performance. The Ton pulse count data may also be used after the chip is deployed in devices to assist in debugging of installed software by a user of the chip. Other uses may include code optimization in relation to comparing how much power different code uses and adjusting the code for low power. The Ton pulse count data may also be used to fine tune parameters with the SIMO buck converter itself. Internal settings may be adjusted to optimize efficiency and reduce the duration of TON pulses. Alternatively, on the fly optimization of the buck converter required due to change in external conditions, supply voltage, chip aging or temperature change may also be performed based on the Ton pulse count data.

Figure 3:
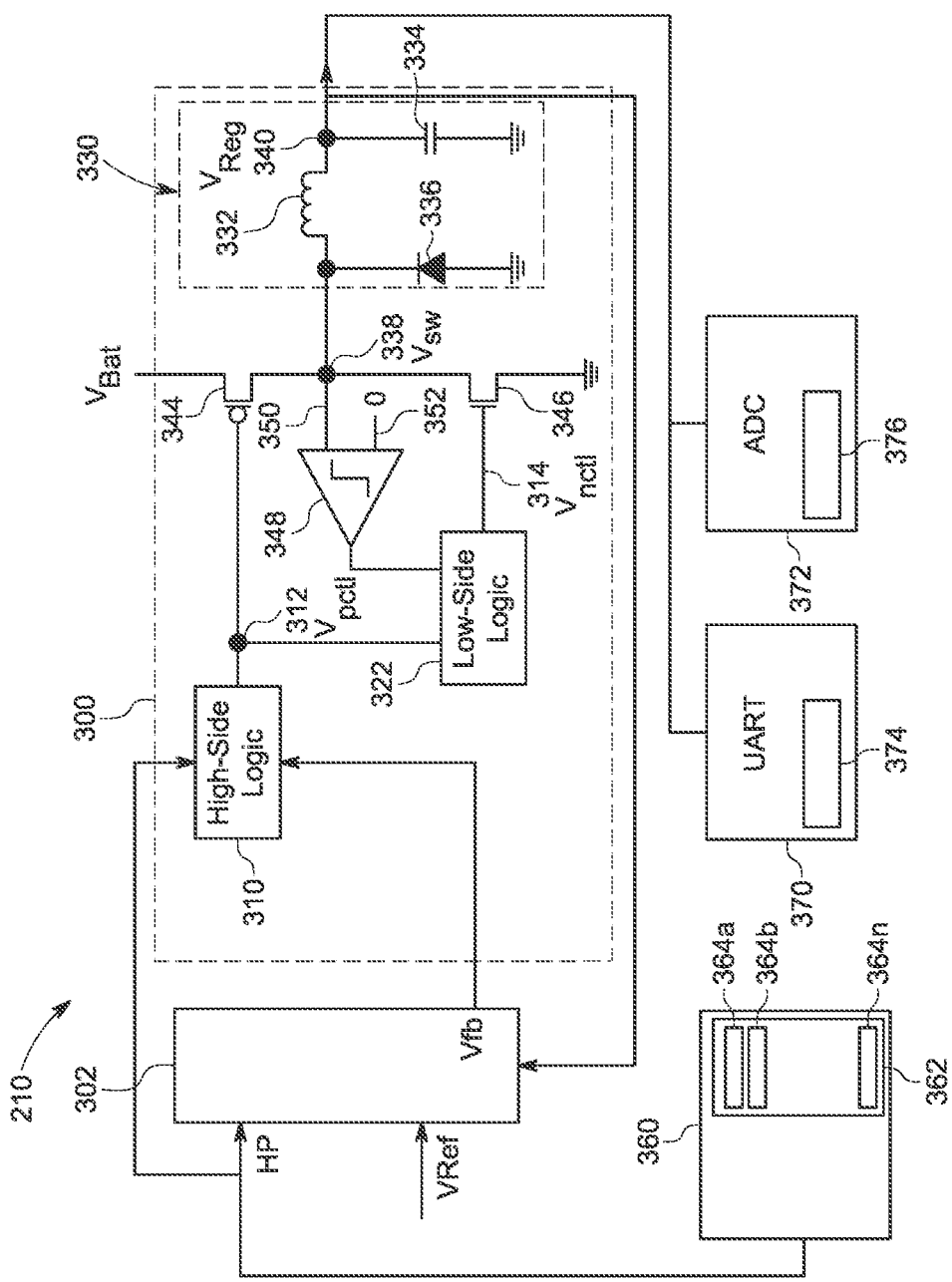
FIG. 3 is a schematic block diagram of a switching facility of a buck converter that powers different devices.

FIG. 3 is a schematic block diagram of the example SIMO buck converter 210 in FIG. 2. The buck converter 210 includes a switching facility 300 and a feedback facility 302. One or both of the switching facility 300 and the feedback facility 302 may have a high power mode and a low power mode. The switching facility 300 may further take as an input VBat, which is coupled to an external power source, such as a battery or an external voltage regulator. The switching facility 300 includes a regulated voltage output at a voltage/node 340 (VReg), which is a stepped down voltage from VBat. In this example, a power monitor controller 360 such as a microcontroller or the like provides a high power (binary 1) signal HP to the switching facility 300 and the feedback facility 302. Any form of logical device or circuit may be used instead of a dedicated controller for power control. In this example, the power monitor controller 360 may run a plug-in module to collect snap-shots of power data from the microcontroller system 100. The plug-in module may send the snap-shot data to an external computing device for power analysis of the microcontroller system. An example plug-in module is described in U.S. application Ser. No. 17/744,388, filed on May 20, 2022, hereby incorporated by reference in its entirety.

The feedback facility 302 takes as an input a reference voltage VRef and has an input coupled to a VReg. The feedback facility 302 includes an output VFB (feedback voltage) that is based on a comparison of VRef to a function of VReg, or a function of VReg to a function of VRef. The switching facility 300 will then switch on power to the VReg node 340 when indicated by VFB. As discussed in detail below, the frequency at which the switching facility 300 evaluates VFB and potentially connects VReg to VBat is a function of the signal on the HP line. When a signal (e.g., a binary 1 voltage) is asserted on the HP line, the polling frequency of a comparator within the switching facility 300 is increased relative to when the signal is not asserted. For purpose of this disclose "high voltage" or "binary 1" shall be understood to refer to a voltage sufficiently high to turn on a high threshold transistor for the implementing process, e.g. an NMOS transistor in the CMOS technology used to implement the buck converter 210. A "low voltage" or "binary 0" is understood to be sufficiently low to turn on a low threshold transistor for the implementing process, e.g., a PMOS transistor in the CMOS technology used to implement the buck converter 210.

In some embodiments, a biasing current driving a comparator in one or both of the switching facility 300 and the feedback facility 302 is reduced when the signal is not asserted on the HP line relative to the biasing current when the signal is asserted. In some embodiments, the impedance of a voltage divider that steps down VReg is also increased when the signal is not asserted on the HP line relative to the impedance of the voltage divider when the signal is asserted.

Figure 4:
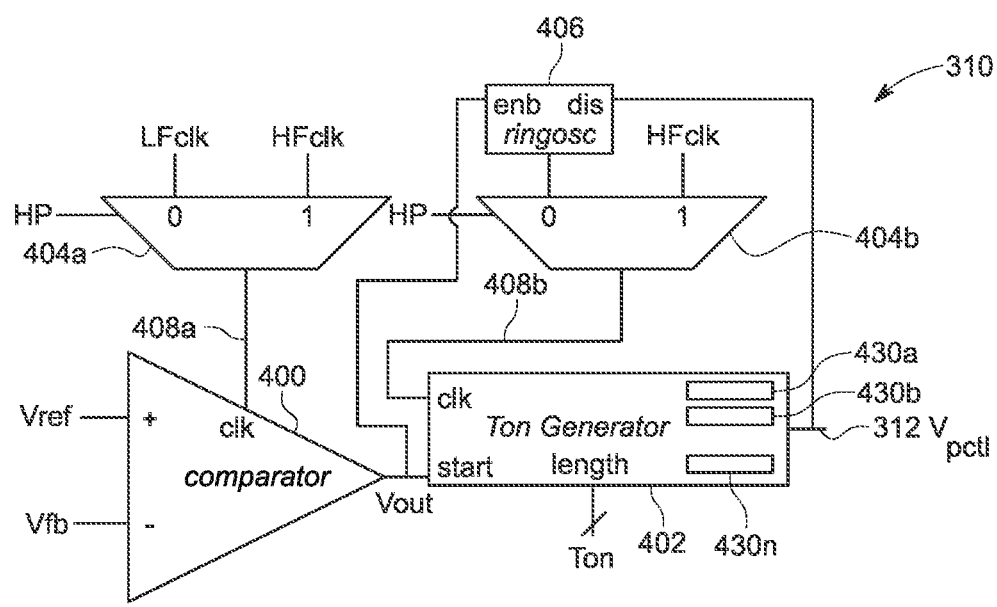
FIG. 4 is a schematic block diagram of high side logic of the switching facility in FIG. 3.

A high side logic 310 of the switching facility 300 takes as an input VFB generated by the feedback facility 302 and outputs a signal to a node 312 (voltage Vpctl). A low side logic 322 has an input coupled to the node 312 Vpctl and provides an output to a node 314 (voltage Vnctl). The high and low side logics 310 and 322 switch the NMOS and PMOS transistors in the switching facility 300 to provide the desired voltage at VReg. An example implementation of the high side logic 310 is shown in FIG. 4.

FIG. 3 further shows an example reactive step-down circuit 330 including an inductor 332, a capacitor 334, and a diode 336 having the illustrated configuration which is common to most buck converters known in the art. As is apparent one end of the inductor 332 is coupled to a node 338 (voltage VSW) and the other end is coupled to a regulated voltage output (VREG) 340. The VREG output 340 is coupled to ground by the capacitor 334 and the node 338 (VSW) is coupled to ground by the diode 336, which is oriented to allow current flow toward the node 338 (VSW).

When the feedback facility 302 asserts a signal on the VFB input indicating that the voltage supplied by the VREG output 340 is low, the high side logic 310 asserts a low (e.g., binary 0) voltage on the node 312 (Vpctl), which turns on a PMOS transistor 344 allowing current to flow through the inductor 332 thereby powering the reactive step-down circuit.

When the feedback facility 302 no longer asserts a signal on the VFB input (indicating that the VREG output 340 is no longer low), the high side logic 310 asserts a high (e.g., binary 1) voltage on Vpctl, which turns off PMOS transistor 344 and causes low side logic 322 to assert a high (e.g., binary 1) signal on the node 314 (Vnctl), which turns on an NMOS transistor 346. The NMOS transistor 346 then allows current to flow from ground to VSW. In this manner, when PMOS transistor 344 is turned on, current flow through the inductor 332 begins to increase exponentially. When PMOS transistor 344 is turned off and the NMOS transistor 346 is turned on, the inductor 332 continues to draw current from ground inasmuch as an inductor 332 resists changes in current.

The low side logic 322 further takes as an input the output of a comparator 348. The comparator 348 has a positive input 350 coupled to the node 338 (VSW) and a negative input 352 coupled to a low (e.g., binary 0) voltage. Accordingly, when the voltage at the node 338 (VSW) is above the low voltage, the node 338 will output a high (e.g., binary 1) voltage at its output. The low side logic 322 may be configuring to transition the node 314 (Vnctl) to a low (e.g., binary 0) voltage in response to the high voltage on the output of the comparator 308. Accordingly, the NMOS transistor 346 will be turned off when the PMOS transistor 344 is turned on and the node 338 (VSW) rises above the low voltage.

FIG. 4 is block diagram of an example implementation of the high side logic 310 in FIG. 3. In particular, the high side logic 310 decreases the frequency at which the feedback voltage VFB is evaluated ("the polling frequency") by a comparator 400 when the HP line is not asserted relative to the polling frequency when the HP line is asserted.

The comparator 400 has its positive (+) input coupled to VRef and its negative (−) input coupled to VFB, which may be a regulated voltage, such as an attenuated version of a regulated voltage. The output (Vout) of the comparator 400 is coupled to a "start" input of a counter or Ton generator 402. Upon detecting a rising edge on its start input, the Ton generator 402 counts a number of rising edges on its clock (clk) input. From detecting the rising edge on its start input until the number of rising edges counted is equal to a programmed value, e.g., a Ton value provided on a length input of the Ton generator 402, the Ton generator 402 causes a transition on its output, which is coupled to Vpctl in this case.

In this example, the output of the Ton generator 402 goes from the high voltage to the low voltage after the rising edge is detected on the start input and stays at the low voltage until the number of counted clock cycles is equal to the length input. The output of the Ton generator 402 may then change to the high voltage. Of course, the above description of the Ton generator 402 is subject to delays in propagating of start and clock signals through the Ton generator 402 and therefore the transitions on the output of the Ton generator 402 may be delayed 1-2 clock cycles relative to what is described above.

As shown in FIG. 4, the comparator 400 also has a clock (clk) input and functions such that a result of the comparison of its positive and negative inputs is latched and held at its output in response to a rising clock edge on its clock input.

In the illustrated embodiment, the clock input of the comparator 400 is coupled to an output 408a of a multiplexor 404a. The multiplexor 404a has one input (0) coupled to a low frequency clock (LFclk) and a second input (1) coupled to a high frequency clock (HFclk). The high frequency clock produces pulses at a higher frequency than the low frequency clock, such as between 100 and 1000 times higher. For example, the high frequency clock may be above 1 MHz whereas the low frequency clock is between 1 and 100 kHz.

The selector of the multiplexor 404a is coupled to the HP line. Accordingly, when the HP line indicates operation in the high frequency mode, the high frequency clock is coupled to the output 408a and controls the polling frequency of the comparator 400. Otherwise, the low frequency clock is coupled to the output 408a and controls the polling frequency of the comparator 400. In this manner, the power consumption of the comparator 400 is reduced when not in the high power mode.

In some instances, it may be desirable to keep the pulses of power supplied to the reactive step-down circuit to be at or near the same length in both high and low power mode. Accordingly, the clock input of the Ton generator 402 may be coupled to the output 408b of a multiplexor 404b. The multiplexer 404b takes as one input (0) an output of a ring oscillator 406 and as its other input (1) the high frequency clock (HFclk). The selector of the multiplexor 404b may likewise be coupled to the HP line.

In this manner, a ring oscillator 406 provides a clock signal to the clock input of the Ton generator 402 in the low power mode and the high frequency clock is coupled to the clock input of the Ton generator 402 in the high power mode. The ring oscillator 406 may have a frequency substantially equal to the high frequency clock, e.g., within 10 percent. In this manner, the length of pulses clocked by the ring oscillator 406 will be substantially equal to pulses clocked by the high frequency clock. In instances where a designer wishes the pulses to be unequal, the frequency of the ring oscillator 406 may be larger than or smaller than the frequency of the high frequency clock. Use of the ring oscillator 406 enables a frequency similar in frequency to the high frequency clock to be generated in the low power mode without using the power required to activate the high frequency clock. The high frequency clock (not shown) may therefore be powered down when the HP line is not asserted and powered up when the HP line is asserted.

In this example, the ring oscillator 406 may have an enable (enb) input that is coupled to the output of the comparator 400. Accordingly, the ring oscillator 406 is turned on when the comparator 400 indicates that the Ton generator 402 should generate a pulse. The ring oscillator may remain on in response to a rising edge on the enable input until a rising edge on the output (Vpctl) of the Ton generator 402 is detected at a disable (dis) input of the ring oscillator 406. In this manner, the ring oscillator 406 is turned off after the Ton generator 402 has counted out a pulse.

To further save on power, the enable input of the ring oscillator 406 may only be enabled when the HP line is not asserted, such as by ANDing the inverse of the HP line (!HP) with the output of the comparator 400 and inputting the result of the ANDing to the enable input of the ring oscillator 406.

The SIMO buck converter 210 (shown in FIGS. 1-3) allows multiple voltage rails to be connectable to different peripheral devices or components. In this example, only a single voltage output is shown for simplicity. In this example, each peripheral device of component includes a counter that is enabled when the peripheral device is turned on to perform operations. For example, FIG. 3 shows two peripheral devices 370 and 372 that may be connected to the VREG node 340 when the devices 370 and 372 require power to perform an operation. Each of the devices 370 and 372 includes a respective counter 374 and 376. In this example, the device 370 is a Universal Asynchronous Receiver/Transmitter (UART) while the device 372 is an analog to digital converter (ADC). Other devices may include memory/storage devices, processors such as MCU cores, USB devices, ADCs, digital to analog converter (DACs), custom analog circuits, and other similar devices and components shown in FIGS. 1A-1B.

The counters 374 and 376 run for a period of time and each increments with every Ton pulse when the devices 370 and 372 are enabled by connection to the buck converter 210. When the peripheral device is disabled, the recorded value of the counter is stored in a register in the power monitor controller 360 associated with the buck converter 210. The device may also send identification data associated with the device and the operation performed to the power controller 360. The power monitor controller 360 includes a bank of registers 362 that includes multiple registers such as registers 364a-n that each store the recorded value of the counters for a particular peripheral. In this example, the register 364a corresponds to the device 370, while the register 364b corresponds to the device 372. Alternatively, a look up table with temporary entries for different registers may be used. Alternatively, a register may be assigned for a power value for all components on a rail. The individual components maybe identified based on the times when such components are activated in relation to command signals from a processor to activate such devices. The recorded value is denoted by a dedicated power number for the peripheral device indicating the power requirement for that specific operation. In certain circumstances, precise power is not required, and the Ton pulse count can provide a relative comparison of power use. For example, if an operation takes 10 Ton pulses, but a setting is changed and the operation then takes 9 Ton pulses, a user may determine that the new setting saves power.

For more precise power data requirements, the power consumption may be determined by using an ADC to measure input voltage and output voltage. Ton pulse duration is known because the duration is timed by a clock. Power in is then a function of VDDin, VDDout, Ton time, number of pulses, and the value of the inductor.

The registers 364a-364n in the register bank 362 of the power controller 360 in FIG. 3 may be configured to be read by software. Power numbers of the different peripheral devices are determined and stored on the registers 420a-420n of the register bank 422 of the power monitor controller 360. The controller 360 in this example includes logic/firmware to determine power consumption as a function of Ton counts from the count values stored in each register 364a-364n corresponding to a specific peripheral device. The logic/firmware of the controller 360 may determine a power number for each peripheral device and a corresponding trim value for the buck converter 210 when the device is enabled through connection to the buck converter 210.

For example, an ADC may be enabled to take a measurement and takes 100 Ton pulses. An example master serial peripheral interface (MSPI) operation occurs and takes 200 Ton pulses. A USB device may require 400 Ton pulses. Based on the Ton pulse counts from these devices, the controller 360 now knows how to scale Ton trims of the Ton pulse generator depending on what devices are enabled. For example, the controller could scale the clock to the comparator to depend on a known load. The clock may be set at 1 kHz for no load, 700 kHz for ADC+MSPI+USB operation, and only 200 kHz for MSPI alone. The Ton trim may be increased to deliver more power if needed (possibly at expense of slight inefficiency loss). A look up table may be provided that includes optimal trim values that set the duration of Ton pulses for the buck converter 210 for different power requirements.

The data for Ton pulse counts may be used for different purposes requiring power measurement. For example, the pulse counts may be used in the testing process of the chip to fine tune the chip. The pulse counts may be used in real-time to adjust settings on the chip where power levels are too high for certain components. Thus, certain components may be turned off to conserve power or turning down certain clock outputs. The power measurement data may also be transmitted off chip for further analysis.

The trim values are then provided from the controller 360 to the buck converter 210. The trim values are stored in separate programmable registers 430a-430n in the Ton generator 402 in FIG. 4 that correspond to particular components and devices as well as different functions.

As an alternative to counting Ton pulses, the voltage waveforms on the buck converter 210 can be monitored to observe presence of the Ton pulses as ripples (saw tooth shapes). The number of ripples by themselves can inform how many Ton pulses have been generated and thus independently indicate power consumption for the peripheral devices to the controller 360 for purpose of adjusting the buck converter 210. A ripple may be detected via a comparator set at a set voltage level that will be triggered when the leading edge of the ripple exceeds the set voltage level.

Figure 5:
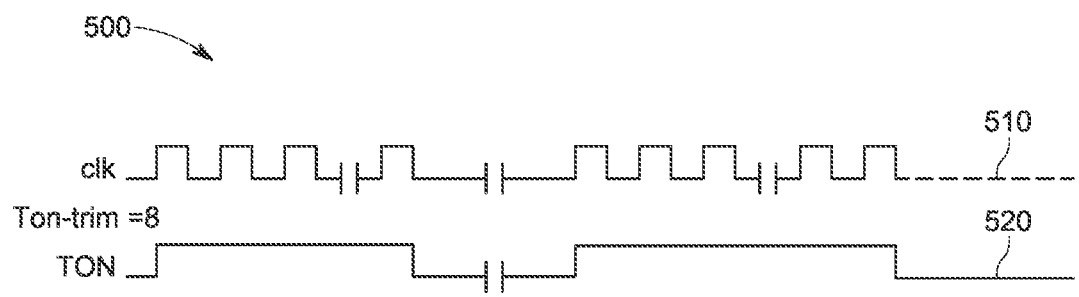
FIG. 5 is an example timing diagram of the signals from the Ton pulse generator in FIG. 4.

FIG. 5 shows a timing diagram of example voltage waveforms for the buck converter 210 in FIG. 3. A first waveform 510 shows the clock signal driving the buck converter 210. A second waveform 520 shows the Ton pulses generated by the Ton pulse generator 402 while a device such as the device 370 in FIG. 3 is enabled.

In this example, the clock in the buck converter 210 is running at 100 MHz, with a period of 10 ns in the clock signal shown in the waveform 510. The trim value for the Ton pulses (TON_trim=8) for the particular device in this example determines the time duration of the Ton pulse when the particular device is powered by the buck converter 210. Other trim values (e.g., 3, 4, 5, 6, etc. may correspond to power requirements for different peripheral devices). In this example, since the trim value is 8, the time duration of the Ton pulse is 80 ns. Increasing the Ton trim from 8 to 9 will allow more power to delivered and a decrease in efficiency will be acceptable if the buck converter 210 can supply larger loads. A Ton pulse is only issued when the load capacitor level has dropped and the buck converter 210 needs to charge the capacitor to reach the desired power level. Otherwise, the Ton waveform remains continually low.

Figure 6:
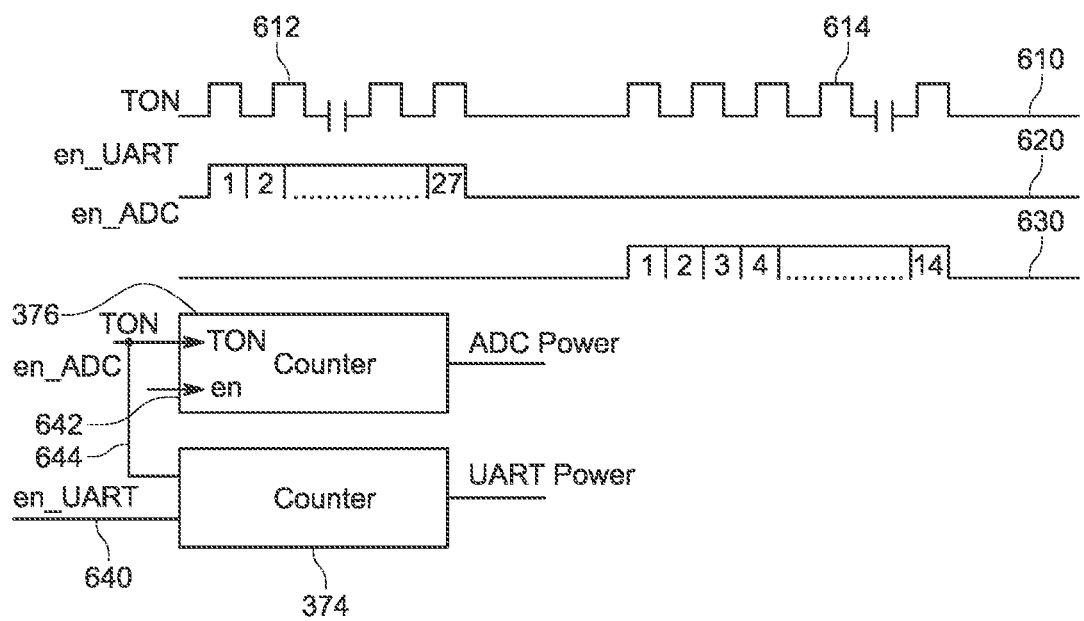
FIG. 6 is an example timing diagram of the signals of from the Ton pulse generator that are stored in counters in different devices.

FIG. 6 shows example timing waveforms for a counter within a peripheral device such as the devices 370 or 372 in FIG. 3. FIG. 6 shows a waveform 610 that shows Ton pulses generated in a first section 612 for powering a first device such as the UART device 370 and a second section 614 that shows Ton pulses generated for powering a second device such as the ADC device 372. A second waveform 620 represents the enable signal to the counter 374 in the first device 370. Another waveform 630 represents the enable signal to the second counter 376 in the second device 372. When in a high state, the respective enable signals 620 and 630 cause the Ton pulses to be output to the buck converter 210 and the respective counters count the Ton pulses when the enable signals 620 and 630 are high.

As shown in FIG. 6, each counter 374 and 376 within the example peripheral devices 370 and 372 has a respective enable input 640 and 642 (shown as enable_UART and enable_ADC input) and a Ton input 644. When the enable_UART input 640 or the enable_ADC input 642 goes high, the respective counters 372 or 374 increment on the rising edge of each received Ton pulse. Thus, when the enable input 640 is high, the counter 374 counts the Ton pulses input on the Ton input 644. When the enable input 642 is high, the counter 376 counts the Ton pulses input on the Ton input 644. In this example, based on the section 612 of the waveform 610, 27 Ton pulses are needed to maintain the operation of the UART interface device 370. Based on the section 614 of the waveform 610, 14 Ton pulses are needed to maintain the operation of the analog-to-digital converter (ADC) device 372. When UART interface device 370 or the ADC device 372 is disabled, the output of the respective counters 370 and 372 within the respective peripheral device 370 or 372 is stored in a programmable register (362*a*-362*n*) in a measurement counter in the power monitor module 360 of the buck converter 210.

In this example, the trim values are determined when each individual device is powered by the buck converter 210. In cases, where more than one device is powered by the buck converter 210, the trim values for each respective device and each operation are used to determine an overall trim value to optimize power supply to the multiple components. The overall trim value may be determined by the controller 360 or internally by the Ton generator.

The frequency of Ton pulses received by the buck converter 210 are measured using voltage comparators that compare the feedback voltage trims associated with each peripheral device with the charge in the load capacitor to determine when additional charging would be needed. For example, if a voltage rail is 1V, a single comparator may be used that has a 1V threshold. When the voltage drops below 1V, the comparator triggers the applying of charge in the buck converter 210. A second comparator at 0.95V threshold may be provided. If the second comparator is triggered, this indicates more charge is required, and thus the Ton trim may be adjusted to provide more charge. Thus, if the buck converter needs a lot of power, more than one voltage comparator can be added. Alternatively, the buck converter could also be supplied with more charge per pulse from each voltage comparator, in which case the voltage comparator is preferably monitored more frequently to determine how often the load capacitor needs to be charged.

While having a counter for Ton pulses for each component or device is an important high-level metric, the power-profiling of the component or devices needs to be calibrated to achieve accuracy, in order to make dynamic voltage adjustment effective. The calibration relates power consumed to the power profile of a particular peripheral device. This relationship could look different for the same workload across different points. The calibration can be achieved by adding/multiplying coefficients to the feedback voltage trims to the buck converter, performing offsets as needed to compensate for process and temperature variation, and adding a feedback loop/register to the Ton pulses as they are generated. Additional external information such as the health of the external battery, efficiency of the external regulator, and variation of components in operation, may also be used in the calibration process. The calibration could be performed by a software and/or hardware in combination with a software.

For example, external inductor values used by DC to DC converters can vary by +/−20%. A calibration cycle could be run to ensure that each part is tuned to work with its inductor. Once a device is assembled, an optimization routine may enable a peripheral, and trims are selected such that maximum power efficiency is achieved. Variations in an external voltage regulator that generates supply voltage for on chip DC to DC (VDDin) could also be handled in this way. The optimization routine may be run periodically so that as VDDin decreases indicating battery decay or temperature changes, the trims could be recalibrated.

When the power consumption is known from the power number for a peripheral device, the feedback voltage trim of the buck converter 210 can be dynamically adjusted to deliver the requisite amount of power to the peripheral device when the device is engaged. Further, if the power number of a peripheral device continues to increase or the microcontroller system 100 and/or the analog module 200 is dissipating an increasing amount of heat, this may indicate that the buck converter 210 is providing less power per Ton pulse to the peripheral device. This in turn may mean declining health of the external battery or voltage regulator connected to the buck converter. The control module may issue a warning to a user to check the external power source.

In some embodiments, voltage rails powered from buck converter that go off-chip to supply voltage (independently or as a shared output) to external peripheral devices located off-chip may also be monitored using voltage waveforms from the buck converter 210. If the external peripheral devices are connected to an external buck converter, the ripples on the voltage waveform of that external buck converter can be monitored to determine the number of Ton pulses and therefore, their power consumption. Thus, power profiling of the external peripheral devices connected to each buck converter is achieved, and accordingly, power profiling for the entire system can be achieved through observing and/or counting Ton pulses. This power profiling of the full system can be captured in a separate power integrated circuit and/or combined with a conventional coulomb counter to extract more information related to voltage and power consumption.

Figure 7:
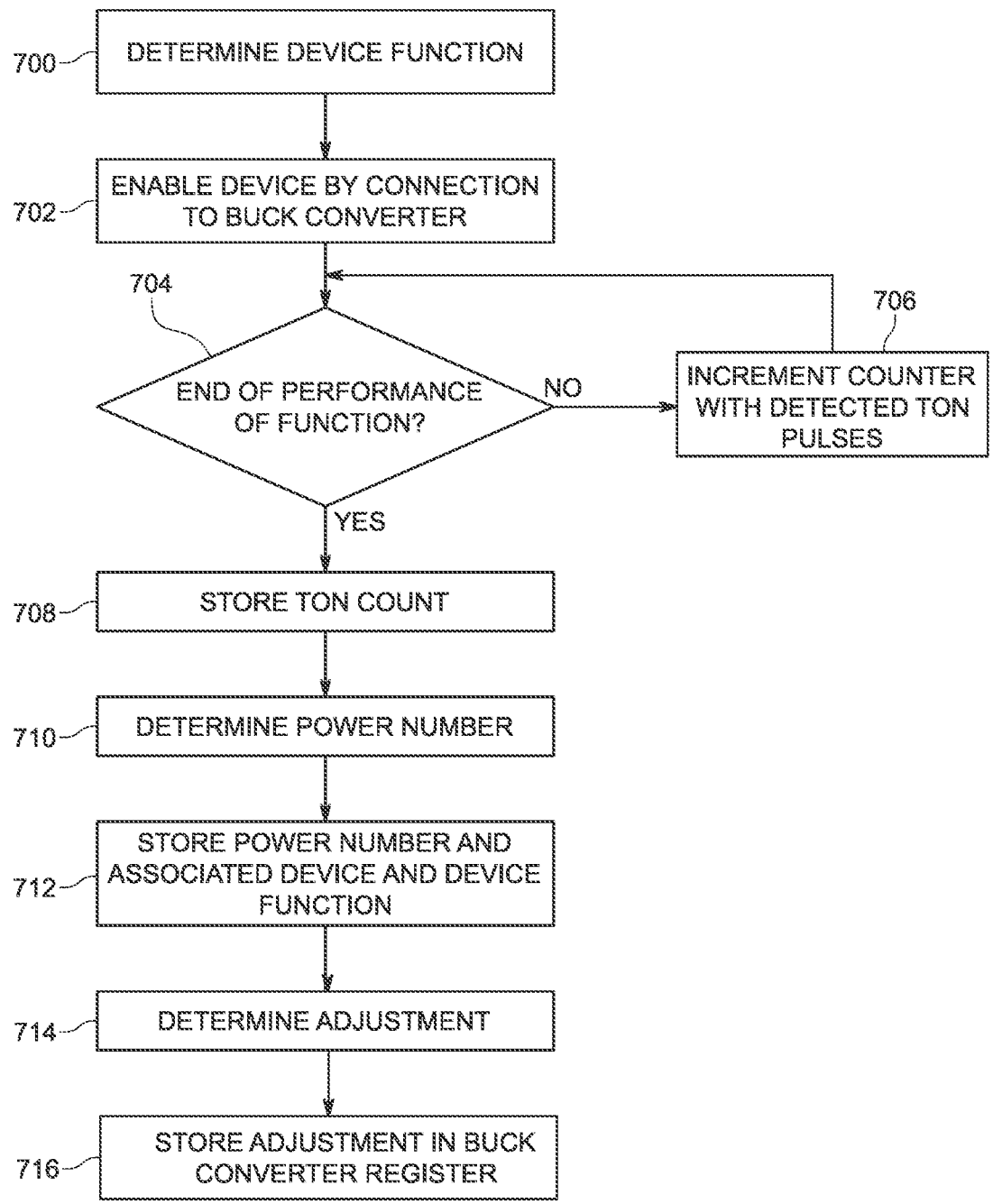
FIG. 7 is a flow diagram of storage and analysis of Ton pulses to adjust voltage trim values for the buck converter in FIG. 2.

FIG. 7 shows the process of collecting Ton pulse counts and adjustment of the trim values of the buck converter. The flow diagram in FIG. 7 is representative of example machine readable instructions for determining power requirements for an operation of a device based on Ton counts from a buck converter. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowchart illustrated in FIG. 7, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The routine first determines the operation of a device (700). The operation of the device may be determined by a command to the device to be enabled to perform a requested function. The routine then enables the device by connecting the device to the voltage output of the buck converter (702). The routine checks whether the device has completed the requested function (704). While the function is being performed, the counter on the device is active and detects the Ton pulses and increments the counter. Once the function is complete, the routine disconnects the voltage output of the buck converter from the device thus disabling the device.

The routine stores the Ton pulse count from the counter in a register of the power controller (708). The routine then determines the power requirement of the device for performing the function from the Ton pulse count and the duration of the Ton pulses. The routine stores the power requirement, associated device function and device in a register associated with the device (712). The routine then determines the adjustment based on the power requirement (714). In this example, the adjustment may be a trim value for the duration of the Ton pulses produced by the buck converter. The adjustment is then stored in a register in the buck converter for application when the function of the device is requested again (716).

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware, generalized hardware made specialized by the execution of software thereon that enables the hardware to perform specific function, software stored on a computer-readable medium, or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system for determining a power requirement for a device, the system comprising:
   a buck converter supplying output voltage, the output voltage of the buck converter driven by a Time on (Ton) pulse generator generating Ton pulses to control charging of a load capacitor of the buck converter;
   a device coupled to buck converter, the buck converter supplying output voltage to the device and the device having a counter counting Ton pulses during the supply of output voltage; and
   a controller coupled to the counter and the buck converter operable to determine the power requirement for the device based on the count of the Ton pulses.

2. The system of claim 1, wherein the device and buck converter are integrated in a system on chip.

3. The system of claim 1, wherein the controller is further operable to determine an adjustment for the buck converter based on the power requirement.

4. The system of claim 1, wherein the adjustment includes determining a trim value for the duration of the Ton pulse based on the power requirement.

5. The system of claim 4, wherein the buck converter includes a register, and wherein the controller is operable to store the determined trim value in the register, wherein the buck converter adjusts the duration of the Ton pulses generated by the Ton pulse generator for supplying output voltage to power the device based on the determined trim value.

6. The system of claim 1, wherein the controller is operable to store the determined power requirement.

7. The system of claim 1, wherein the controller is further operable to:
   determine a first device function performed by the device;
   associate the determined power requirement with the first device function;
   determine a second device function performed by the device;

determine a second power requirement determined from the count of Ton pulses from the device performing the second device function; and associate the determined second power requirement with the second device function.

8. The system of claim 1, wherein the device is one of an ADC, a DAC, an UART, a controller, or a storage component.

9. The system of claim 1, wherein the controller includes a bank of registers, wherein the power requirement determined from the count of Ton pulses associated with the device is stored in one of the registers of the bank of registers, and the other registers store a corresponding power requirement determined from a count of Ton pulses from different devices powered by the buck converter.

10. The system of claim 1, wherein the buck converter has different voltage level outputs based on connection of a high frequency clock and a low frequency clock.

11. The system of claim 1, wherein the controller is operative to determine a flaw in an external power source coupled to the buck converter, based on a comparison of the count of Ton pulses being more than a previous count of Ton pulses associated with the device.

12. The system of claim 1, wherein the count of the Ton pulses is determined by detecting a leading edge of the pulse.

13. The system of claim 1, wherein the count of the Ton pulses is determined by detecting a voltage ripple from the output voltage of the buck converter.

14. A method of determining power requirement of a device on a system on chip, the method comprising:

coupling a voltage output of a buck converter to power the device;

generating Time on (Ton) pulses to drive the buck converter to provide a voltage level at the voltage output for powering the device;

keeping a count of the Ton pulses on a counter on the device;

storing the count of the Ton pulses from the counter after depowering the device; and determining the power requirement of the device based on the stored count of the Ton pulses.

15. The method of claim 14, further comprising adjusting the buck converter based on the determined power requirement.

16. The method of claim 14, further comprising determining a trim value for the duration of the Ton pulse based on the power requirement.

17. The method of claim 14, further comprising transmitting the power requirement of the device to an external device.

18. The method of claim 14, further comprising determining a flaw in an external power source coupled to the buck converter based on a comparison of the count of Ton pulses being more than a previous count of Ton pulses associated with the device.

19. The method of claim 14, further comprising:

determining a first device function performed by the device;

associating the determined power requirement with the first device function;

determining a second device function performed by the device;

determining a second power requirement determined from the count of Ton pulses from the device performing the second device function; and associating the determined second power requirement with the second device function.

20. A non-transitory computer readable medium having stored thereon software instructions that, when executed by a processor, cause the processor to:

store a count of Ton pulses driving a buck converter powering a device in a counter of the device;

determine the power requirement of the device based on the stored count of Ton pulses; and adjust the power to the device provided from the buck converter based on the power requirement.

* * * * *